US009113284B2

(12) United States Patent
Hillan et al.

(10) Patent No.: US 9,113,284 B2
(45) Date of Patent: Aug. 18, 2015

(54) METHODS AND APPARATUS FOR IMPROVING MANAGEMENT OF NFC LOGICAL CONNECTIONS

(75) Inventors: John Hillan, Farnborough (GB); Alan Gillespie, Farnborough (GB)

(73) Assignee: QUALCOMM Incorporated, San Diego, CA (US)

( * ) Notice: Subject to any disclaimer, the term of this patent is extended or adjusted under 35 U.S.C. 154(b) by 419 days.

(21) Appl. No.: 13/585,697

(22) Filed: Aug. 14, 2012

(65) Prior Publication Data

US 2013/0052950 A1 Feb. 28, 2013

Related U.S. Application Data

(60) Provisional application No. 61/527,975, filed on Aug. 26, 2011.

(51) Int. Cl.
*H04B 5/00* (2006.01)
*H04W 8/00* (2009.01)
*G06K 7/00* (2006.01)
*H04L 29/06* (2006.01)

(52) U.S. Cl.
CPC ............. *H04W 8/005* (2013.01); *G06K 7/0008* (2013.01); *H04L 69/28* (2013.01)

(58) Field of Classification Search
CPC .................................................. H04W 8/005
USPC ............................ 455/41.1, 68, 410; 709/220
See application file for complete search history.

(56) References Cited

U.S. PATENT DOCUMENTS

| | | | |
|---|---|---|---|
| 8,060,012 B2 | 11/2011 | Sklovsky et al. | |
| 2009/0191811 A1 | 7/2009 | Griffin et al. | |
| 2009/0282130 A1* | 11/2009 | Antoniou et al. | 709/220 |
| 2010/0291896 A1* | 11/2010 | Corda | 455/410 |
| 2011/0065385 A1 | 3/2011 | Geslin et al. | |
| 2011/0124297 A1 | 5/2011 | Son et al. | |

(Continued)

FOREIGN PATENT DOCUMENTS

| | | |
|---|---|---|
| JP | 2012118569 A | 6/2012 |
| WO | WO-2010011055 A2 | 1/2010 |
| WO | WO2010096789 A1 | 8/2010 |

OTHER PUBLICATIONS

International Search Report and Written Opinion—PCT/US2012/051947—ISA/EPO—Dec. 5, 2012.

(Continued)

*Primary Examiner* — Hsin-Chun Liao
(74) *Attorney, Agent, or Firm* — Charles E. Eggers

(57) ABSTRACT

Aspects disclosed herein relate to improving mechanisms for managing logical connection establishment between NFCC and a DH. In one example, with a NFC device a NFCC may be configured to receive a core initialization command, from a DH, as part of an initialization and activation procedure. The NFCC may be configured to transmit a core initialization response to the DH without information associated with a static RF connection. Thereafter, the NFC device may detect one or more remote NFC endpoints. The NFCC may further be operable to determine a maximum payload size and an initial number of credits for the static RF connection based, at least in part, on at least one of a RF interface or a RF protocol used by a remote NFC endpoint chosen for communications, and transmit the determined maximum payload size and the initial number of credits to the DH to establish a logical connection.

32 Claims, 8 Drawing Sheets

(56) References Cited

U.S. PATENT DOCUMENTS

2011/0130095 A1    6/2011    Naniyat et al.
2011/0226853 A1    9/2011    Soh et al.

OTHER PUBLICATIONS

"Smart cards; UICC-CLF interface; CLF Host Controller Interface (Release 7)", ETSI Draft; SCPT070124, European Telecommunications Standards Institute (ETSI), 650, Route Des Lucioles ; F-06921 Sophia-Antipolis ; France, No. V0.3.0, Mar. 12, 2007, pp. 1-78, XP014051651, [retrieved on Mar. 12, 2007].

"Smart Cards; UICC-CLF interface; Host Controller Interface P2P LNC Protocol (Document inputted in NFC Forum for information)", ETSI Draft; SCPT080001, European Telecommunications Standards Institute (ETSI), 650, Route Des Lucioles ; F-06921 Sophia-Antipolis ; France, No. V0.1.0, Jan. 11, 2008, pp. 1-33, XP014051745, [retrieved on Nov. 1, 2008].

NFC Forum: "Near Field Communication Interface and Protocol (NFCIP-1)," 2nd Edition, Dec. 2004, 65 pages.

\* cited by examiner

METHODS AND APPARATUS FOR IMPROVING MANAGEMENT OF NFC LOGICAL CONNECTIONS

CLAIM OF PRIORITY UNDER 35 U.S.C. §119

The present application for patent claims priority to Provisional Application No. 61/527,975 entitled "METHODS AND APPARATUS FOR IMPROVING MANAGEMENT OF NFC LOGICAL CONNECTIONS" filed Aug. 26, 2011, and assigned to the assignee hereof and hereby expressly incorporated by reference herein.

BACKGROUND

1. Field

The disclosed aspects relate generally to communications between devices and specifically to methods and systems for improving mechanisms for managing logical connection establishment between a Near Field Communication (NFC) controller (NFCC) and a device host (DH).

2. Background

Advances in technology have resulted in smaller and more powerful personal computing devices. For example, there currently exist a variety of portable personal computing devices, including wireless computing devices, such as portable wireless telephones, personal digital assistants (PDAs) and paging devices that are each small, lightweight, and can be easily carried by users. More specifically, the portable wireless telephones, for example, further include cellular telephones that communicate voice and data packets over wireless networks. Many such cellular telephones are manufactured with ever increasing computing capabilities, and as such, are becoming tantamount to small personal computers and hand-held PDAs. Further, such devices are enabling communications using a variety of frequencies and applicable coverage areas, such as cellular communications, wireless local area network (WLAN) communications, NFC, etc.

When the NFCC is initially activated to communicate with the DH a static radio frequency (RF) connection is established as part of the process. Currently, the NFCC responds to a core initialization command (CORE_INIT_CMD) from the DH with a core initialization response (CORE_INIT_RSP) indicating, among other elements, a maximum data packet payload size and an initial number of credits, and assigning a connection identifier (ID) (ConnID) with a fixed value of zero. This exchange of messages occurs prior to the NFCC detecting any remote NFC endpoint, and as such, prior to the NFCC possessing any knowledge relating to potential future RF connection requirements. In other words, under current specifications, during initialization the NFCC defines not just the amount of memory allocated to the static RF connection (e.g., logical connection) with ConnID=0, but both the width (payload size) and the depth (credits) of the buffer, without any information about the nature of the data that may pass through this connection. The NFCC may not become aware of which RF protocol and/or RF interface to be used for data communication until after a remote NFC endpoint is detected. For example, if the NFCC detects a Type 2 Tag, the NFCC may allocate multiple buffers of 16 byte packets for the simple READ/WRITE commands, whereas if the NFCC detects a Type 4 Tag, the NFCC may allocate comparatively fewer 256 byte packets for application protocol data unit (APDU) exchange.

Further, current NFC specifications impose a requirement on the NFCC to allocate data buffer memory for Connection ID 0 without any information about a remote NFC endpoint that may use it, and then imposes a requirement on the DH not to use the logical connection until the RF Interface is activated. Yet further, once the buffer memory is allocated, the current NFC specification does not provide any way to resize this buffer memory based on subsequent information about RF Protocol or RF Interface, etc. Moreover, performance for any dynamic logical connections subsequently established may be compromised because there is no way to free the buffer memory for Connection ID 0.

Thus, improved apparatuses and methods for providing mechanisms for managing logical connection initialization and buffer allocation may be desired.

SUMMARY

The following presents a summary of one or more aspects in order to provide a basic understanding of such aspects. This summary is not an extensive overview of all contemplated aspects, and is not intended to identify key or critical elements of all aspects nor delineate the scope of any or all aspects. Its purpose is to present some concepts of one or more aspects form as a prelude to the more detailed description presented later.

Various aspects are described in connection with improving mechanisms for managing logical connection establishment between a NFCC and a DH. In one example, with a NFC device a NFCC may be configured to receive a core initialization command, from a DH, as part of an initialization and activation procedure. The NFCC may be further configured to transmit a core initialization response to the DH without information associated with a static RF connection. Thereafter, the NFC device may detect one or more remote NFC endpoints. The NFCC may further be operable to determine a maximum payload size and an initial number of credits for the static RF connection based, at least in part, on at least one of a radio frequency (RF) interface or a RF protocol used by a remote NFC endpoint chosen for communications, and transmit the determined maximum payload size and the initial number of credits to the DH to establish a logical connection.

According to related aspects, a method for improving mechanisms for managing logical connection establishment between a NFCC and a DH. The method can include receiving a core initialization command, from a DH, as part of an initialization and activation procedure for a NFCC. The method may include transmitting a core initialization response to the DH without information associated with a static RF connection. The method may further include detecting one or more remote NFC endpoints. The method may further include determining a maximum payload size and an initial number of credits for the static RF connection based, at least in part, on at least one of a RF interface or a RF protocol used by a remote NFC endpoint chosen for communications. Moreover, the method can include transmitting the determined maximum payload size and the initial number of credits to the DH to establish a logical connection.

Another aspect relates to a communications apparatus. The wireless communications apparatus can include means for receiving a core initialization command, from a DH, as part of an initialization and activation procedure for a NFCC. The communications apparatus can include means for transmitting a core initialization response to the DH without information associated with a static RF connection. The communications apparatus can include means for detecting one or more remote NFC endpoints. The communications apparatus can include means for determining a maximum payload size and an initial number of credits for the static RF connection based, at least in part, on at least one of a RF interface or a RF protocol used by a remote NFC endpoint chosen for communications. Moreover, the communications apparatus can include means for transmitting the determined maximum payload size and the initial number of credits to the DH to establish a logical connection.

Another aspect relates to a communications apparatus. The apparatus can include a NFC controller (NFCC) configured to receive a core initialization command, from a DH, as part of an initialization and activation procedure for a NFCC. The NFCC may be configured to transmit a core initialization response to the DH without information associated with a static RF connection. The NFCC may be configured to detect one or more remote NFC endpoints. The NFCC may be configured to determine a maximum payload size and an initial number of credits for the static RF connection based, at least in part, on at least one of a RF interface or a RF protocol used by a remote NFC endpoint chosen for communications. The NFCC may also be configured to transmit the determined maximum payload size and the initial number of credits to the DH to establish a logical connection.

Another aspect relates to a computer program product, which can have a computer-readable medium comprising code for receiving a core initialization command, from a DH, as part of an initialization and activation procedure for a NFCC. Further, the computer-readable medium can include code for transmitting a core initialization response to the DH without information associated with a static RF connection. Further, the computer-readable medium can include code for detecting one or more remote NFC endpoints. Further, the computer-readable medium can include code for determining a maximum payload size and an initial number of credits for the static RF connection based, at least in part, on at least one of a RF interface or a RF protocol used by a remote NFC endpoint chosen for communications. The computer-readable medium can also include code for transmitting the determined maximum payload size and the initial number of credits to the DH to establish a logical connection.

To the accomplishment of the foregoing and related ends, the one or more aspects comprise features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It should be understood, however, that such aspect(s) may be practiced without these specific details.

Generally, a device may recognize a NFC target device and/or tag when within range of the coverage area of the NFC device and/or tag. Thereafter, the device may obtain sufficient information to allow for communications to be established. One form of communications that may be established is a peer-to-peer communications link (e.g., a NFC-DEP based communications link). As described herein, communications between the devices may be enabled over a variety of NFC RF technologies, such as but not limited to, NFC-A, NFC-B, NFC-F, etc. Further, different NFC technologies may be enabled during different phases of communications (e.g., an activation phase, a data exchange phase, etc.) Still further, different bit rates may be used at different phases of communications.

The words "wireless power" is used herein to mean any form of energy associated with electric fields, magnetic fields, electromagnetic fields, or otherwise that is transmitted between from a transmitter to a receiver without the use of physical electromagnetic conductors.

Figure 1:
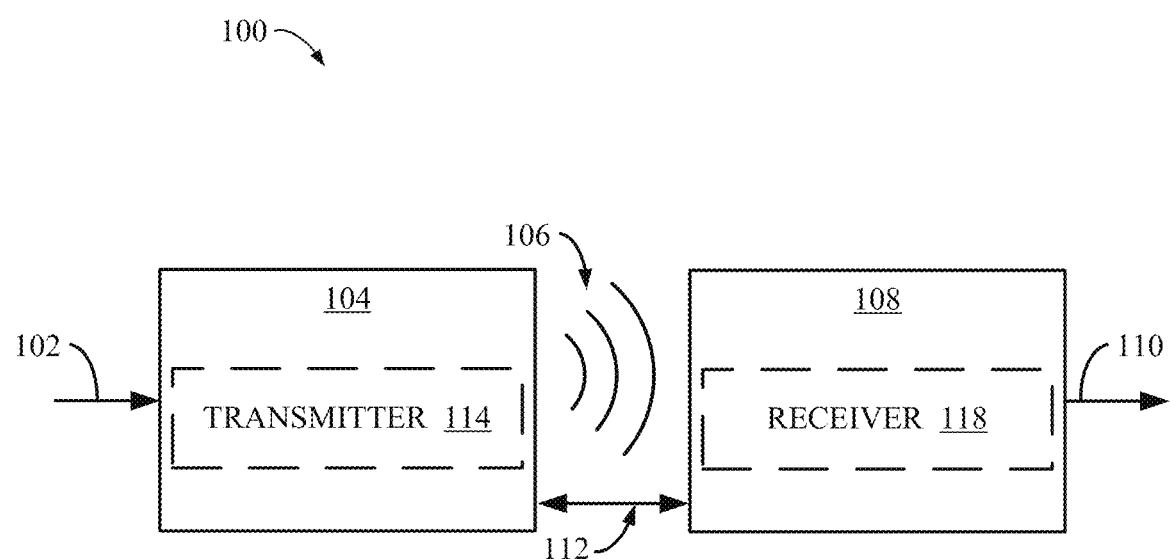
FIG. 1 is a block diagram of a wireless power transfer system according to an aspect.

FIG. 1 is a wireless transmission or charging system 100, in accordance with various exemplary embodiments of the present invention. Input power 102 is provided to a transmitter 104 for generating a radiated field 106 for providing energy transfer. A receiver 108 couples to the radiated field 106 and generates an output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship and when the resonant frequency of receiver 108 and the resonant frequency of transmitter 104 are very close, transmission losses between the transmitter 104 and the receiver 108 are minimal when the receiver 108 is located in the "near-field" of the radiated field 106.

Transmitter 104 further includes a transmit antenna 114 for providing a means for energy transmission. A receiver 108 includes a receive antenna 118 as a means for energy reception. The transmit and receive antennas are sized according to applications and devices associated therewith. As stated, an efficient energy transfer occurs by coupling a large portion of the energy in the near-field of the transmitting antenna to a receiving antenna rather than propagating most of the energy in an electromagnetic wave to the far field. When in this near-field a coupling mode may be developed between the transmit antenna 114 and the receive antenna 118. The area around the antennas 114 and 118 where this near-field coupling may occur is referred to herein as a coupling-mode region.

Figure 2:
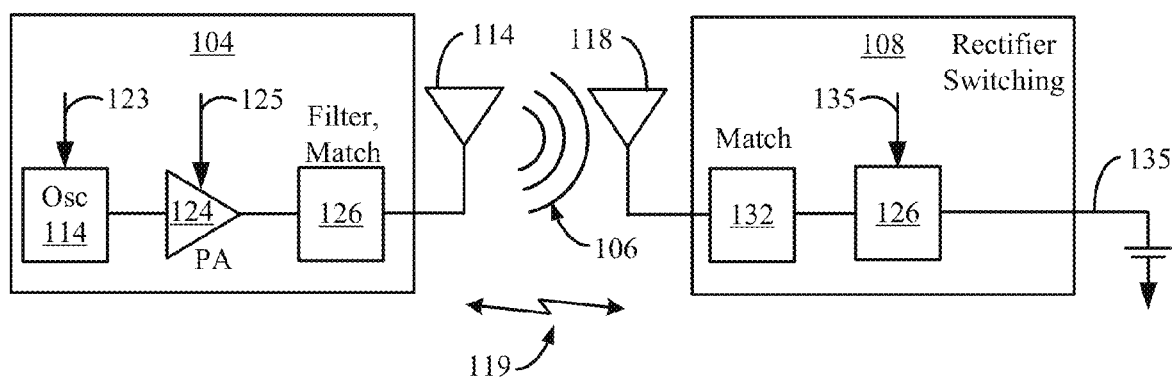
FIG. 2 is a schematic diagram of a wireless power transfer system according to an aspect.

FIG. 2 is a schematic diagram of an example near field wireless communication system. The transmitter 204 includes an oscillator 222, a power amplifier 224 and a filter and matching circuit 226. The oscillator is configured to generate a signal at a desired frequency, which may be adjusted in response to adjustment signal 223. The oscillator signal may be amplified by the power amplifier 224 with an amplification amount responsive to control signal 225. The filter and matching circuit 226 may be included to filter out harmonics or other unwanted frequencies and match the impedance of the transmitter 204 to the transmit antenna 214.

The receiver 208 may include a matching circuit 232 and a rectifier and switching circuit 234 to generate a DC power output to charge a battery 236 as shown in FIG. 2 or power a device coupled to the receiver (not shown). The matching circuit 232 may be included to match the impedance of the receiver 208 to the receive antenna 218. The receiver 208 and transmitter 204 may communicate on a separate communication channel 219 (e.g., Bluetooth, zigbee, cellular, etc).

Figure 3:
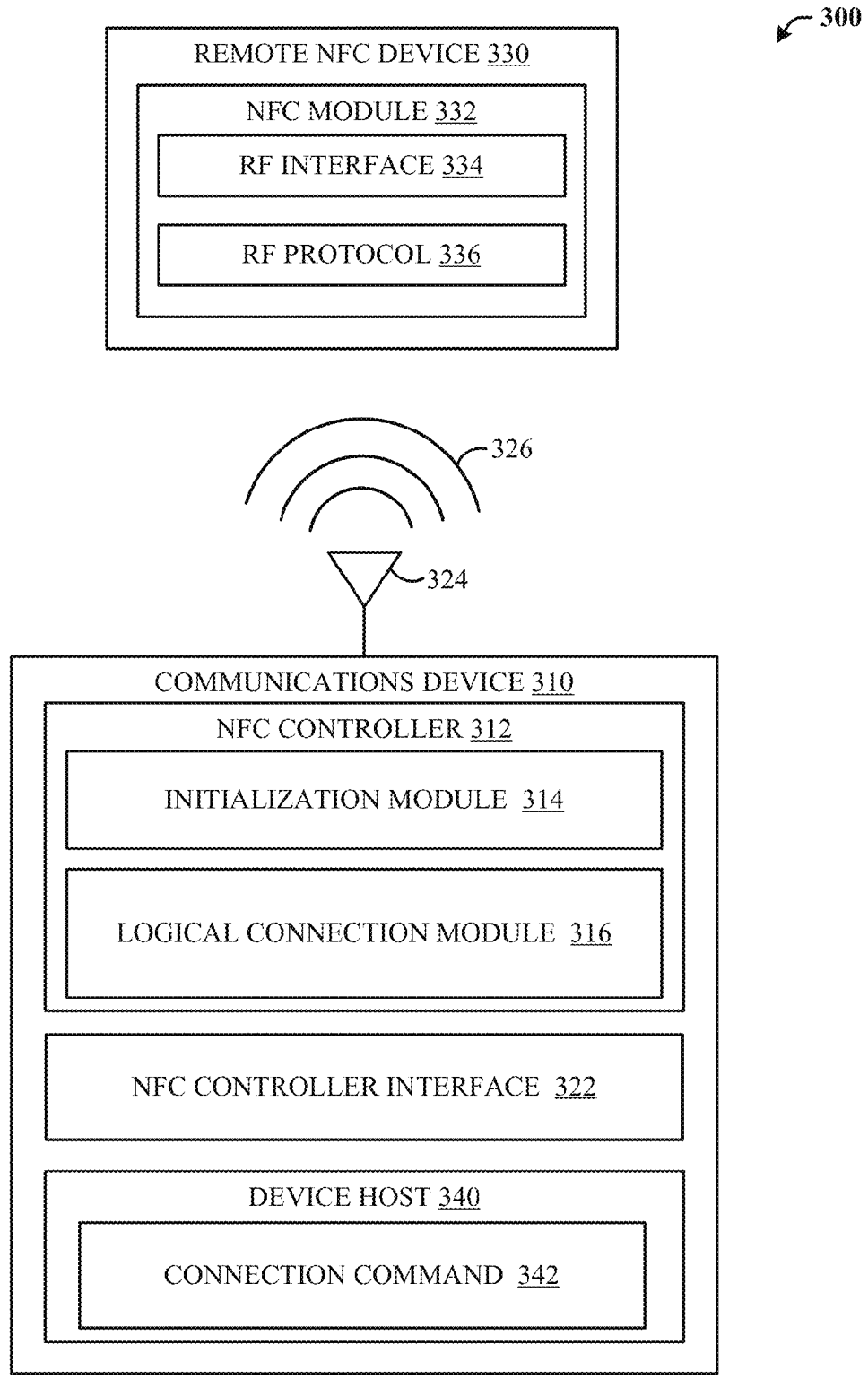
FIG. 3 is a block diagram of a NFC environment according to an aspect.

With reference to FIG. 3, a block diagram of a communication network 300 according to an aspect is illustrated. Communication network 300 may include communications devices 310 which, through antenna 324, may be in communication with a remote NFC device 330 using one or more NFC technologies 326 (e.g., NFC-A, NFC-B, NFC-F, etc.). In an aspect, remote NFC device 330 may be operable to communicate through NFC module 332 with one or more RF interfaces 334 and one or more RF protocols 336. In another aspect, communications device 310 may be operable to be connected to an access network and/or core network (e.g., a CDMA network, a GPRS network, a UMTS network, and other types of wireline and wireless communication networks). In an aspect, remote NFC device may include but is not limited to a remote NFC tag, a reader/writer device, a peer initiator device, a remote peer target device, etc. In such an aspect, the remote NFC tag may include a tag type in the range of 1 to 4.

In an aspect, communications device 310 may include a NFCC 312, a NFC controller interface (NCI) 322, and DH 340. In an aspect, NFCC 312 may include initialization module 314 and logical connection module 316. Initialization module 314 may be operable to initialize and activate internal communications between NFCC 312 and DH 340. In an aspect, such initialization may be accomplished through core initialization messages between the NFCC 312 and DH 340. By way of example and not limitation, an example of the content of a CORE_INIT_RSP message is provided in Table 1. As seen in Table 1, reference to other tables (e.g., Table 9, 90, 94) is made in the context of the NFC specification.

TABLE 1

Core Initialization Response Content
CORE_INIT_RSP

| Payload Field(s) | Length | Value/Description |
|---|---|---|
| Status | 1 Octet | See Error! Reference source not found. |
| NFCC Features | 4 Octets | See Error! Reference source not found. |
| Number of Supported RF Interfaces | 1 Octet | Number of Supported RF Interface fields to follow (n). |
| Supported RF Interface [1 . . . n] | 1 Octet | See Error! Reference source not found. NOTE If supported, the pseudo interface NFCEE Direct RF Interface has to be reported as well. |
| Max Logical Connections | 1 Octet | 0x00-0x0F   Maximum number of Logical Connections supported by the NFCC. 0x10-0xFF   Reserved |
| Max Routing Table Size | 2 Octets | Indicates the maximum amount of data in Octets that are possible in a routing configuration (see Section Error! Reference source not found.). If Listen Mode Routing is not supported, then the value SHALL be 0x0000. |
| Max Control Packet Payload Length | 1 Octet | Indicates the maximum payload length of a NCI Control Packet that the NFCC is able to receive. Valid range is 32 to 255. NOTE All control messages exchanged prior to this have a length that is smaller than 32 octets. |
| Max Size for Large Parameters | 2 Octets | The maximum size in octets for the sum of the sizes of PB_H_INFO and LB_H_INFO_RESP parameter values. |
| Manufacturer ID | 1 Octet | IC Manufacturer ID, as defined in [Error! Reference source not found.]. If this information is not available, the NFCC SHALL return 0x00. |
| Manufacturer Specific Information | 4 Octets | This field contains NFCC manufacturer specific information like chip version, firmware version, etc, encoded in a manufacturer-specific mode. If this information is not available, or the Manufacturer ID is set to 0x00, the NFCC SHALL return all octets containing 0x00. |

Referring to Table 1, the CORE_INIT_RSP message provided by initialization module 314 does not include fields to define a maximum data packet payload size and an initial number of credits. As such, initialization module 314 may not establish a logical connection with DH 340 as part of an initialization and activation procedure.

In operation, once NFCC 312 detects the presence of one or more remote NFC devices 330, logical connection module 316 may establish a logical connection with DH 340 and assign a connection ID taking into account potential buffer usage for a data connection with the detected remote NFC device 330. For example, if the NFCC detects a Type 2 Tag, the NFCC 312 may allocate multiple buffers of 16 byte packets for the simple READ/WRITE commands, whereas if the NFCC detects a Type 4 Tag, the NFCC 312 may allocate comparatively fewer 256 byte packets for application protocol data unit (APDU) exchange. In an aspect, upon detection of the remote NFC device 330, NFCC 312 may communicate the detection to DH 340. DH 340 may provide a connection command 342 (e.g., CORE_DH_CONN_SMD) defining the RF protocol and RF interface to use to facilitate communications with the detected remote NFC device 330. Logical connection module 316 may use the content of the connection command 342 to determine buffer values associated with a logical connection between DH 340 and NFCC 312. Further, NFCC 730 may determine at least a maximum data packet payload size and an initial number of credits. In an aspect, a connection ID (e.g., ConnID) may be assigned any whole number value from 0 to 15. Specifically, In an aspect, ConnID=0 may be used in the same manner as any other legal value for the connection ID.

Accordingly, NFCC 312 utilizes an efficient, optimized, and simplified procedure for establishing a logical connection by delaying definition of buffer related values until a remote NFC device is detected.

FIGS. 4-6B illustrate methodologies in accordance with various aspects of the presented subject matter. While the methodologies are shown and described as a series of acts or sequence steps for the purposes of simplicity of explanation, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 4:
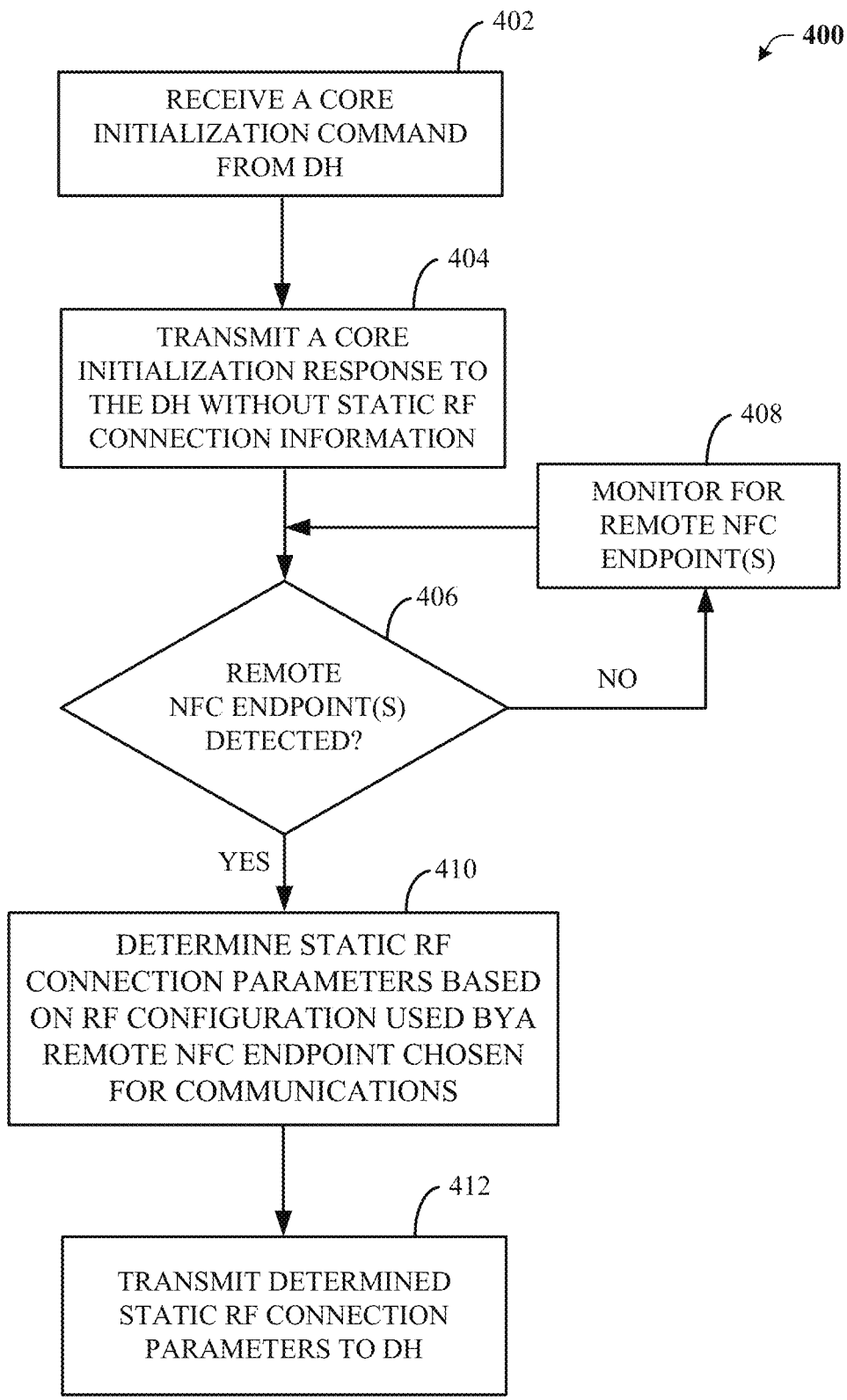
FIG. 4 is a flowchart describing an example of managing logical connection initialization, according to an aspect.

With reference now to FIG. 4, a flowchart describes an example process 400 for efficiently managing logical connection establishment and buffer. At block 402, an NFCC may receive a core initialization command (CORE_INIT_CMD) from the DH. At block 404 the NFCC may transmit a core initialization response (CORE_INIT_RSP) to the DH. In an aspect, the core initialization response does not include state RF connection information, such as but not limited to, maximum payload size and an initial number of credits. In such an aspect, the transmitted core initialization response may not establish a logical connection.

At block 406, the NFCC may determine whether one or more remote NFC endpoints are detected. In an aspect, the one or more remote NFC endpoints may include a remote NFC tag, a reader/writer device, a peer initiator device, a remote peer target device, etc. In such an aspect, a remote NFC tag may include a tag type in the range of 1 to 4. In an aspect in which multiple remote NFC endpoints are detected, the NFCC may communicate detection of each of the remote NFC endpoints using RF discovery notification (RF_DISCOVER_NTF) messages to the DH, and the DH may respond with a RF discovery selection command (RF_DISCOVER_SELECT_CMD) selecting one remote NFC endpoint which to communication.

If at block 406, the NFCC has not detected any remote NFC endpoints, then at block 408 the NFCC continues to monitor for remote NFC endpoints to arrive within the coverage area of the NFCC. By contrast, if at block 406, a remote endpoint is detected, then at block 410 NFCC may determine static RF connection parameters such as but not limited to, buffer values, a maximum payload size and an initial number of credits associated with a logical connection established by the DH. In an aspect, the establishment of the logical connection may be accomplished through the NFCC transmitting an RF interface activated (RF_INTF_ACTIVATED_NTF) message to the DH to indicate a remote NFC endpoint has been detected, and receiving a core DH connection command (CORE_DH_CONN_CMD) to prompt the NFCC to determine a maximum payload size and an initial number of credits for the logical connection. In another aspect, where multiple remote NFC endpoints are detected, the NFCC may transmit a RF discovery notification for each detected remote NFC endpoint, and the DH may respond with a RF discover select response indicating with which of the detected remote NFC endpoints the DH will communicate.

At block 412, the NFCC may transmit the determined static RF connection parameters to the DH. In an aspect, the NFCC may confirm receipt and application of the values included in the core DH connection command through a core DH connection response (CORE_DH_CONN_RSP) message. In an aspect, the core DH connection response may include a maximum payload size and an initial number of credits. In an aspect, the logical connection may be defined as static or dynamic. In another aspect, there is no distinction between a static RF connection and a dynamic logical connection. The established logical connection may be assigned a connection ID. In an aspect, where there is no distinction between a static RF connection and dynamic logical connection, the logical connection may be assigned a connection ID from 0 to 15. In other words, the connection ID 0 may not be reserved for a static RF connection, and any connection ID may be used by any logical connection.

Figure 5A:
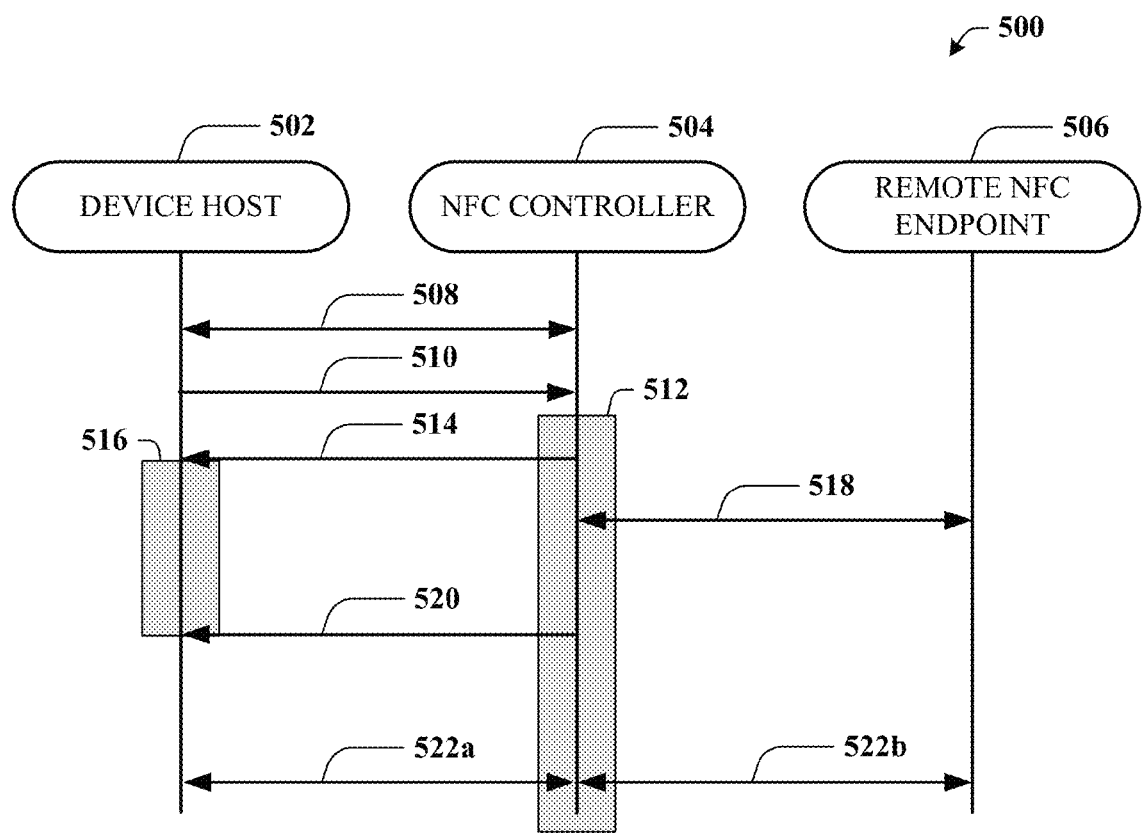
FIG. 5A is a call flow diagram describing an example of initializing a static RF connection.
Figure 5B:
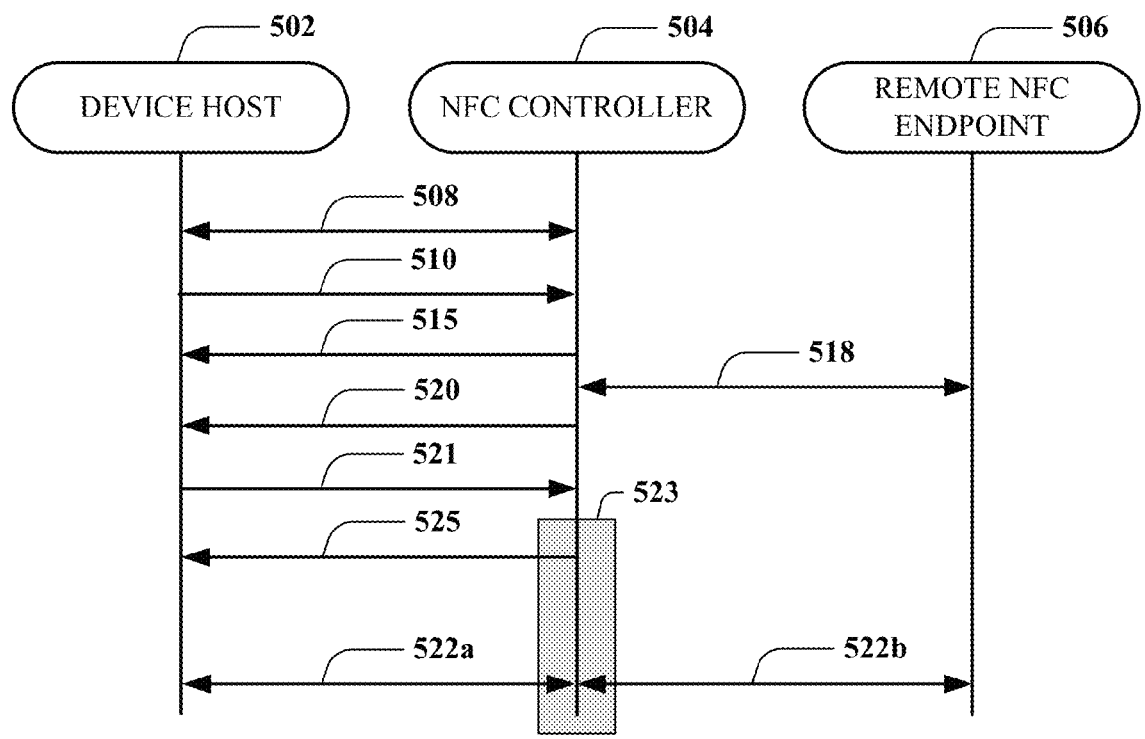
FIG. 5B is another call flow diagram describing an example of initializing a static RF connection, according to an aspect.

FIGS. 5A and 5B are call flow diagrams associated with set up of a static RF connection under the current NFC specification (FIG. 5A), and according to an aspect of the described subject matter (FIG. 5B). With reference now to FIG. 5A, an example call flow diagram describing a static RF connection establishment procedures is illustrated. As depicted in FIG. 5A a NFC environment 500 may include a device host 502, a NFCC 504 and a remote NFC endpoint 506.

At act 508, the DH 502 and NFCC 504 may perform a core reset procedure including transmission of a core reset command (CORE_RESET_CMD) by the DH 502 and a transmission of a core reset response (CORE_RESET_RSP) by the NFCC 504. In an aspect, such a procedure may reset any settings previously associated with NFCC 504.

At act 510 a core initialization command may be transmitted by DH 502 to NFCC 504. The core initialization command prompts NFCC 504 to establish a static RF connection including allocation of a buffer (512). Allocation of the buffer includes defining a maximum payload size and an initial number of credits. At act 514, upon establishment of the buffer and logical connection may transmit a core initialization response (CORE_INIT_RSP) message to DH 502 including the settings of the established static RF connection. At act 516, the NFC specification indicates that this established RF connection may not be used until a remote NFC endpoint 506 is detected. Note that memory is allocated before any potential future use is known. Further, note that this memory allocation may not be changed later, because the information about maximum data packet payload size and initial number of credits is only ever sent in CORE_INIT_RSP for the static RF Connection.

At act 518, NFCC 504 detects the presence of remote NFC endpoint 506. One may note, that up until this point, the NFCC 504 does not know whether it will be acting as a polling device or a listening device, nor does the NFCC 504 know the RF protocol and/or RF interface remote NFC endpoint 506 may be operable to use.

At act 520, NFCC may communicate remote NFC endpoint 506 configuration information to DH 502. In an aspect, the configurations may be transmitting using an RF interface activated notification (RF_INTF_ACTIVATED_NTF) message. Thereafter, at act 522*a* data may be communicated from DH 502 to NFCC 504 and on to remote NFC endpoint 506 at act 522*b*. In such an implementation, the static RF connection buffer size may not be changed after creation, and as such may not provide an optimal buffer size for data communications between DH 502 and remote NFC endpoint 506.

With reference now to FIG. 5B, an example call flow diagram describing a logical connection establishment procedures is illustrated according to an aspect. As depicted in FIG. 5B a NFC environment 500 may include a device host 502, a NFCC 504 and a remote NFC endpoint 506. In the interest of clarity and to reduce duplicity, acts that correspond to acts described with reference to FIG. 5A are labeled with the same number and their description is omitted below. At act 515, in response to receipt of the core initialization command, NFCC 504 may respond with configuration values, such as described in Table 1. In an aspect, the core initialization response does not include fielding defining a maximum payload size and an initial number of credits, and as such no logical connection is established as a result of the initialization process. At act 521, in response to receipt of the RF interface activated notification message, DH 502 may transmit a core connection command (CORE_DH_CONN_CMD). In an aspect, the core DH connection command may include configuration settings sufficient to establish a logical connection. At act 523, the logical connection may be established and a connection ID may be assigned to the established connection. In an aspect, the logical connection may be assigned a connection ID of 0. At act 525, the NFCC 504 responds to DH 502 indicating the establishment of the logical connection. In an aspect, the response may include a maximum payload size and an initial number of credits. In an aspect, the response may be a core DH 502 connection response (CORE_DH_CONN_RSP). As noted above, thereafter, at act 522*a* data may be communicated from DH 502 to NFCC 504 and on to remote NFC endpoint 506 at act 522*b*. In such an implementation, the creation of the buffer is delayed until NFCC 504 has knowledge of potential data communications, RF interfaces, RF protocols, to be used for communications between DH 502 and remote NFC endpoint 506. Compared to the current NFC specification, as depicted in FIG. 5A, the only modification to commands is that the maximum data packet payload size and the initial number of credits are removed from CORE_INIT_RSP. All other control and data messages including CORE_DH_CONN_CMD and CORE_DH_CONN_RSP remain as defined in the current draft.

Figure 6A:
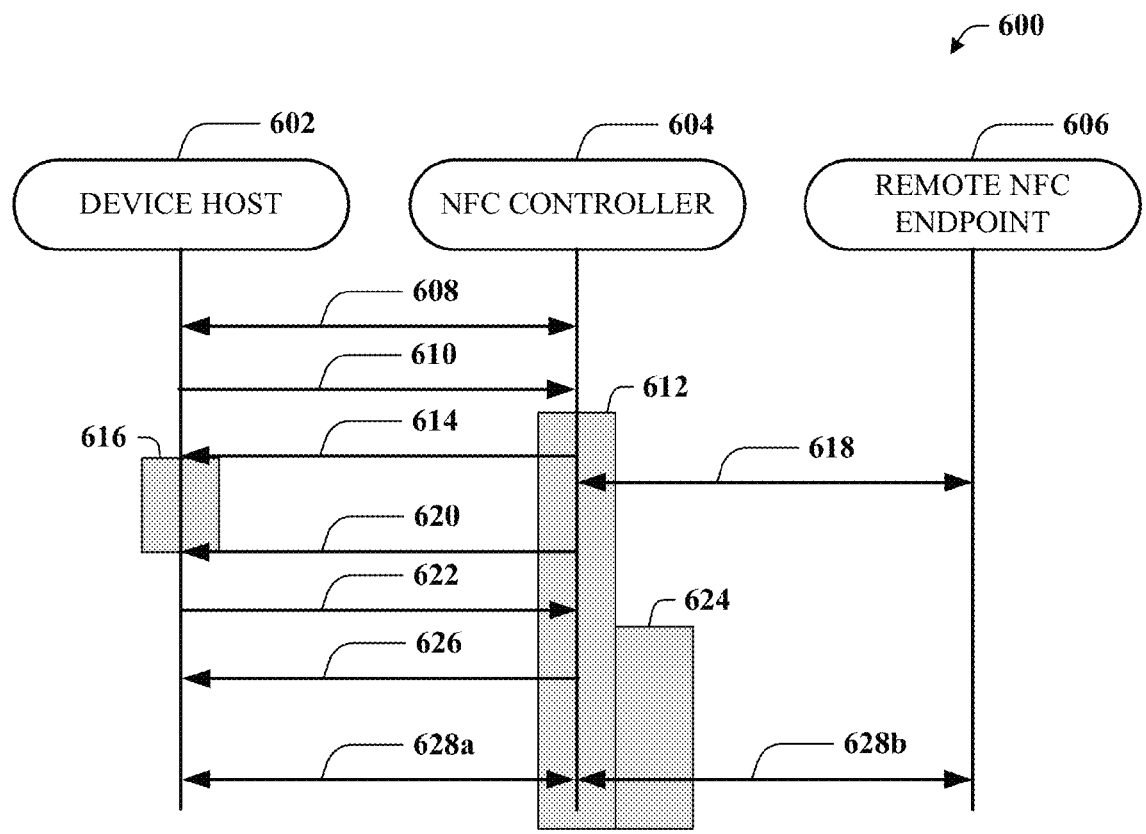
FIG. 6A is a call flow diagram describing an example of initializing a dynamic logical connection.
Figure 6B:
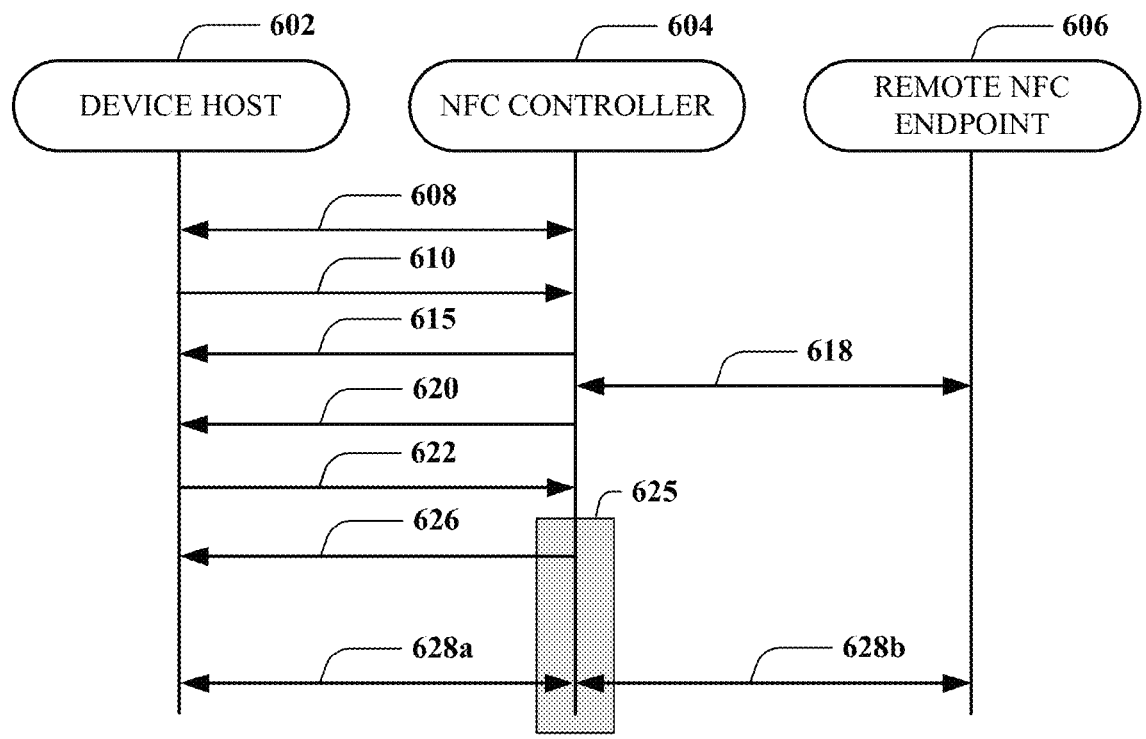
FIG. 6B is a call flow diagram describing an example of initializing a dynamic logical connection, according to an aspect.

FIGS. 6A and 6B depict example call flow diagrams associated set up of a dynamic logical connection under the current NFC specification (FIG. 5A), and according to an aspect of the described subject matter (FIG. 5B). With reference now to FIG. 6A, an example call flow diagram describing a dynamic logical connection establishment procedures is illustrated. As depicted in FIG. 6A a NFC environment 600 may include a device host 602, a NFCC 604 and a remote NFC endpoint 606.

At act 608, the DH 602 and NFCC 604 may perform a core reset procedure including transmission of a core reset command (CORE_RESET_CMD) by the DH 602 and a transmission of a core reset response (CORE_RESET_RSP) by the NFCC 604. In an aspect, such a procedure may reset any settings previously associated with NFCC 604.

At act 610 a core initialization command may be transmitted by DH 602 to NFCC 604. The core initialization command prompts NFCC 604 to establish a static RF connection including allocation of a buffer (512). Allocation of the buffer includes defining a maximum payload size and an initial number of credits. At act 614, upon establishment of the buffer and logical connection may transmit a core initialization response (CORE_INIT_RSP) message to DH 602 including the settings of the established static RF connection. At act 616, the NFC specification indicates that this established RF connection may not be used until a remote NFC endpoint 606 is detected. Note that memory is allocated before any potential future use is known. Further, note that this memory allocation may not be changed later, because the information about maximum data packet payload size and initial number of credits is only ever sent in CORE_INIT_RSP for the static RF Connection.

At act 618, NFCC 604 detects the presence of remote NFC endpoint 606. One may note, that up until this point, the NFCC 604 does not know whether it will be acting as a polling device or a listening device, nor does the NFCC 604 know the RF protocol and/or RF interface remote NFC endpoint 606 may be operable to use.

At act 620, NFCC may communicate remote NFC endpoint 606 configuration information to DH 602. In an aspect, the configurations may be transmitting using an RF interface activated notification (RF_INTF_ACTIVATED_NTF) message. In the depicted aspect, remote NFC endpoint 606 is configured to establish a dynamic logical connection. Dynamic logical Connections may be used by proprietary RF Interfaces, or by future standardized higher level RF Interfaces such as LLCP High.

At act 622, in response to receipt of the RF interface activated notification message, DH 602 may transmit a core connection command (CORE_DH_CONN_CMD). In an aspect, the core DH connection command may include configuration settings sufficient to establish the requested dynamic logical connection. At act 624, the logical connection may be established and a connection ID may be assigned to the established connection. In an aspect, the logical connection may be assigned a connection ID including any value (1 to 15) other than the connection ID 0 which is reserved for the unused established static RF connection 612. At act 626, the NFCC 604 responds to DH 602 indicating the establishment of the dynamic logical connection. In an aspect, the response may include a maximum payload size and an initial number of credits. In an aspect, the response may be a core DH 602 connection response (CORE_DH_CONN_RSP). Thereafter, at act 628*a* data may be communicated from DH 602 to NFCC 604 and on to remote NFC endpoint 606 at act 628*b*. In such an implementation, because remote NFC endpoint 606 has requested a dynamic logical connection, not only can the Static RF Connection not be changed, it might not even be used for data communications. Such an implemented illustrates at least two inefficiencies present in the current NFC specification. An operator may either allocate a large amount of available memory for the static RF connection in case it is used, and pay the price later on by not having as much memory left for any future Dynamic Logical Connections, or allocate a small amount of memory for the Static RF connection, and risk inefficiency for any future use of the static RF connection.

With reference now to FIG. 6B, an example call flow diagram describing a dynamic logical connection establishment procedures is illustrated. As depicted in FIG. 6B a NFC environment 600 may include a device host 602, a NFCC 604 and a remote NFC endpoint 606. In the interest of clarity and to reduce duplicity, acts that correspond to acts described with reference to FIG. 6A are labeled with the same number and their description is omitted below. At act 615, in response to receipt of the core initialization command, NFCC 504 may respond with configuration values, such as described in Table 1. In an aspect, the core initialization response does not include fielding defining a maximum payload size and an initial number of credits, and as such no logical connection is established as a result of the initialization process. At act 625, the dynamic logical connection may be established and a connection ID may be assigned to the established connection. In an aspect, the logical connection may be assigned a connection ID other than 0. In another aspect, where no distinction is drawn between static RF connection and dynamic logical connection, the logical connection may be assigned a connection ID of 0, or any other whole number between 0 and 15.

Figure 7:
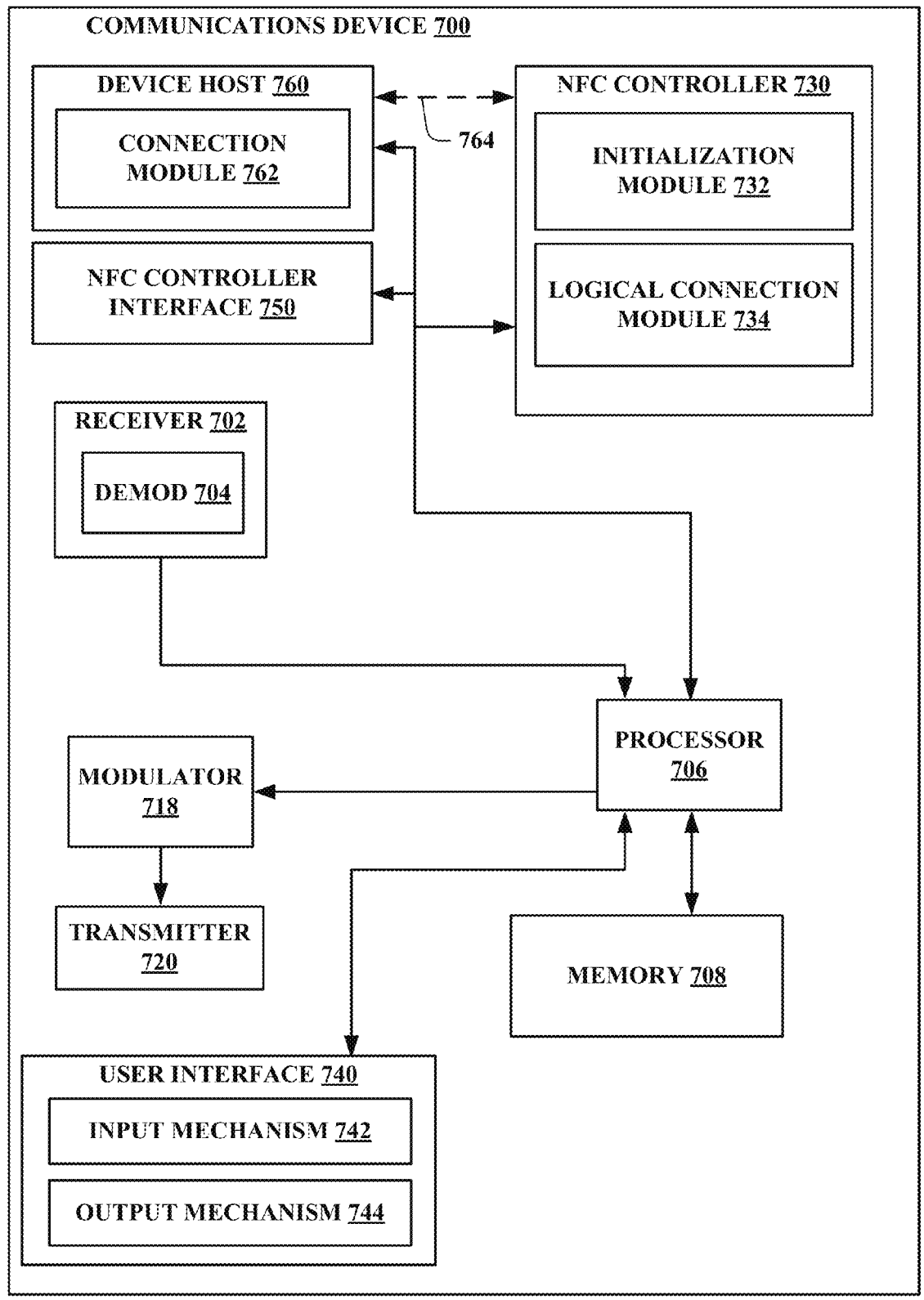
FIG. 7 is a functional block diagram example architecture of a communications device, according to an aspect.

While referencing FIG. 3, but turning also now to FIG. 7, an example architecture of communications device 700 is illustrated. As depicted in FIG. 7, communications device 700 includes receiver 702 that receives a signal from, for instance, a receive antenna (not shown), performs typical actions on (e.g., filters, amplifies, downconverts, etc.) the received signal, and digitizes the conditioned signal to obtain samples. Receiver 702 can include a demodulator 704 that can demodulate received symbols and provide them to processor 706 for channel estimation. Processor 706 can be a processor dedicated to analyzing information received by receiver 702 and/or generating information for transmission by transmitter 720, a processor that controls one or more components of communications device 700, and/or a processor that both analyzes information received by receiver 702, generates information for transmission by transmitter 720, and controls one or more components of communications device 700. Further, signals may be prepared for transmission by transmitter 720 through modulator 718 which may modulate the signals processed by processor 706.

Communications device 700 can additionally comprise memory 708 that is operatively coupled to processor 706 and that can store data to be transmitted, received data, information related to available channels, TCP flows, data associated with analyzed signal and/or interference strength, information related to an assigned channel, power, rate, or the like, and any other suitable information for estimating a channel and communicating via the channel.

Further, processor 706, NFCC 730, receiver 702 and/or transmitter 720 can provide means for receiving a core initialization command, from DH 760, as part of an initialization and activation procedure for NFCC 730, means for transmitting a core initialization response to the DH 760 without information associated with a static RF connection, means for detecting one or more remote NFC endpoints, means for determining a maximum payload size and an initial number of credits for the static RF connection based, at least in part, on at least one of a radio frequency (RF) interface or a RF protocol used by a remote NFC endpoint chosen for communications, and means for transmitting the determined maximum payload size and the initial number of credits to the DH to establish a logical connection.

It will be appreciated that data store (e.g., memory 708) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 708 of the subject systems and methods may comprise, without being limited to, these and any other suitable types of memory.

In another aspect, communications device 700 may include NCI 750. In an aspect, NCI 750 may be operable to enable communications between a NFC enabled antenna (e.g., 702, 720) and NFC controller 730 and device host 760.

Communications device 700 may include a NFC controller 730. In an aspect, NFCC 730 may include initialization module 732 and logical connection module 734. Initialization module 732 may be operable to initialize and activate internal communications between NFCC 730 and DH 760. In an aspect, such initialization may be accomplished through core initialization messages between the NFCC 730 and DH 760. In an aspect, initialization module 732 may not establish a logical connection 764 between NFCC 730 and DH 760 as part of an initialization and activation procedure.

DH 760 may be operable control communications between communications device 700 and a remote NFC endpoint. As part of communicating with remote NFC devices, DH 760 may establish a logical connection 764 with NFCC 730. In an aspect, DH 760 may include a connection module 762 that may be operable to provide a connection command defining a RF protocol and RF interface to use to facilitate communications with the detected remote NFC endpoint.

In operation, once NFCC 730 detects the presence of one or more remote NFC endpoints, logical connection module 734 may establish a logical connection 764 with DH 760 and assign a connection ID taking into account potential buffer usage for a data connection with the detected remote NFC endpoint. For example, if the NFCC 730 detects a Type 2 Tag, the NFCC 730 may allocate multiple buffers of 16 byte packets for the simple READ/WRITE commands, whereas if the NFCC 730 detects a Type 4 Tag, the NFCC 730 may allocate comparatively fewer 256 byte packets for application protocol data unit (APDU) exchange. In an aspect, upon detection of a remote NFC endpoint, NFCC 730 may communicate the detection to DH 760. DH 760 may provide a connection command (e.g., CORE_DH_CONN_CMD) defining the RF protocol and RF interface to use to facilitate communications with the detected remote NFC endpoint. Logical connection module 734 may use the content of the connection command to determine buffer values associated with a logical connection 764 between DH 760 and NFCC 730. For example, NFCC 730 may determine at least a maximum data packet payload size, and an initial number of credits. In an aspect, a connection ID (e.g., ConnID) may be assigned any whole number value from 0 to 15. Specifically, In an aspect, ConnID=0 may be used in the same manner as any other legal value for the connection ID.

Additionally, communications device 700 may include user interface 740. User interface 740 may include input mechanisms 742 for generating inputs into communications device 700, and output mechanism 744 for generating information for consumption by the user of the communications device 700. For example, input mechanism 742 may include a mechanism such as a key or keyboard, a mouse, a touchscreen display, a microphone, etc. Further, for example, output mechanism 744 may include a display, an audio speaker, a haptic feedback mechanism, a Personal Area Network (PAN) transceiver etc. In the illustrated aspects, the output mechanism 744 may include a display operable to present media content that is in image or video format or an audio speaker to present media content that is in an audio format.

Figure 8:
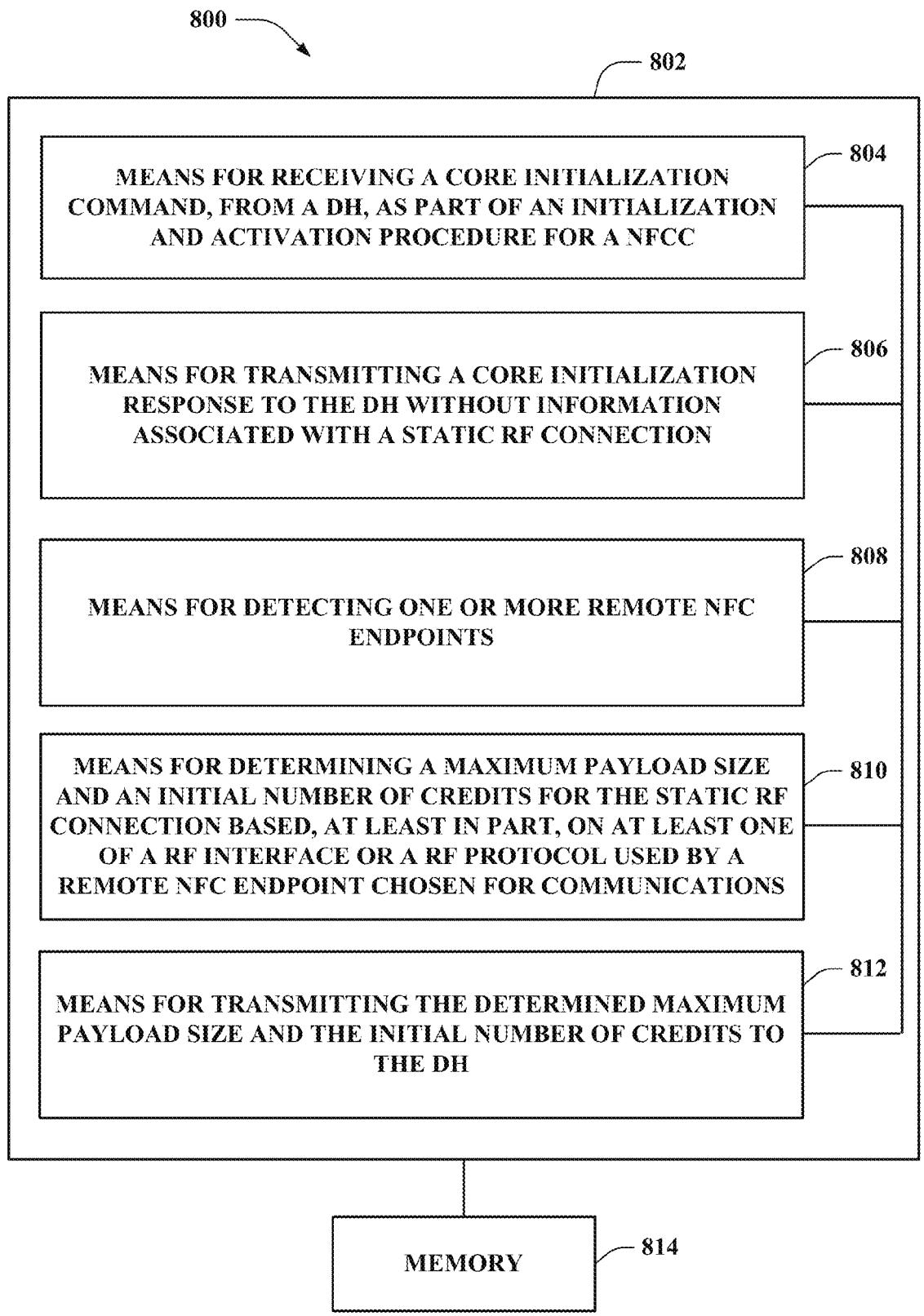
FIG. 8 is a functional block diagram of an example communication system for improving mechanisms for managing logical connection establishment between a NFCC and a DH, according to an aspect.

FIG. 8 is block diagram depicting exemplary communication system 800 operable to provide improved mechanisms for managing logical connection establishment between a NFCC and a DH, according to an aspect. For example, system 800 can reside at least partially within a communications device (e.g., communications device 700). It is to be appreciated that system 800 is represented as including functional blocks, which can be functional blocks that represent functions implemented by a processor, software, or combination thereof (e.g., firmware). System 800 includes a logical grouping 802 of electrical components that can act in conjunction.

For instance, logical grouping 802 can include an electrical component that may provide means for receiving a core initialization command, from a DH, as part of an initialization and activation procedure for a near field communications controller NFCC 804.

Further, logical grouping 802 can include an electrical component that may provide means for transmitting a core initialization response to the DH without information associated with a static RF connection 806.

Further, logical grouping 802 can include an electrical component that may provide means for detecting one or more remote NFC endpoints 808. In another aspect, the logical component 808 may further provide means for detecting two or more remote NFC endpoints, means for communicating detection of each of the two or more NFC endpoints using RF discovery notification messages to the DH, and means for receiving a RF discovery selection command from the DH selecting one remote NFC endpoint of the two or more remote NFC endpoints with which to communication. In an aspect, the remote NFC endpoint may include a remote NFC tag, a reader/writer device, a remote peer initiator device, a remote peer target device, etc. In such an aspect, the remote NFC tag may include a tag type in a range of tag type 1, tag type 2, tag type 3, tag type 4, etc.

Further, logical grouping 802 can include an electrical component that may provide means for determining a maximum payload size and an initial number of credits for the static RF connection based, at least in part, on at least one of a RF interface or a RF protocol used by a remote NFC endpoint chosen for communications 810. In an aspect, the logical component 810 may further provide means for assigning a connection identifier to the logical connection.

Moreover, logical grouping 802 can include an electrical component that may provide means for transmitting the determined maximum payload size and the initial number of credits to the DH to establish a logical connection 812. In an aspect, the logical connection may be a static RF connection. In another aspect, the logical connection may be a dynamic RF connection. In still another aspect, there may be no distinction between static and dynamic RF connections. In such an aspect, a connection identifier, including any whole number from 0 to 15, may be assigned to the logical connection.

Additionally, system 800 can include a memory 814 that retains instructions for executing functions associated with the electrical components 804, 806, 808, 810, and 812, stores data used or obtained by the electrical components 804, 806, 808, 810, 812, etc. While shown as being external to memory 814, it is to be understood that one or more of the electrical components 804, 806, 808, 810, and 812 may exist within memory 814. In one example, electrical components 804, 806, 808, 810, and 812 can include at least one processor, or each electrical component 804, 806, 808, 810, and 812 can be a corresponding module of at least one processor. Moreover, in an additional or alternative example, electrical components 804, 806, 808, 810, and 812 may be a computer program product including a computer readable medium, where each electrical component 804, 806, 808, 810, and 812 may be corresponding code.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal A terminal can also be called a system, device, subscriber unit, subscriber station, mobile station, mobile, mobile device, remote station, mobile equipment (ME), remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH, near-field communications (NFC-A, NFC-B, NFC,-f, etc.), and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An example storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal In the alternative, the processor and the storage medium may reside as discrete components in a user terminal Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or aspects, it should be noted that various changes and modifications could be made herein without departing from the scope of the described aspects and/or aspects as defined by the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

What is claimed is:

1. A method of communication, comprising:
   receiving a core initialization command, from a device host (DH), as part of an initialization and activation procedure for a near field communications (NFC) controller (NFCC);
   transmitting a core initialization response to the DH without information associated with a static radio frequency (RF) connection;
   detecting one or more remote NFC endpoints;
   determining a maximum payload size and an initial number of credits for the static RF connection based, at least in part, on at least one of a RF interface or a RF protocol used by a remote NFC endpoint chosen for communications; and
   transmitting the determined maximum payload size and the initial number of credits to the DH to establish a logical connection.

2. The method of claim 1, further comprising:
   assigning a connection identifier to the logical connection.

3. The method of claim 2, wherein the connection identifier is assigned a number from 0 to 15.

4. The method of claim 1, wherein the logical connection comprises a static RF connection.

5. The method of claim 1, wherein the logical connection comprises a dynamic logical connection.

6. The method of claim 1, wherein the one or more remote NFCC endpoints comprises:
a remote NFC tag, a reader/writer device, a remote peer initiator device, or a remote peer target device.

7. The method of claim 6, wherein the remote NFC tag comprises a tag type in a range of 1 to 4.

8. The method of claim 1, wherein the detecting further comprises:
detecting two or more remote NFC endpoints;
communicating detection of each of the two or more NFC endpoints using RF discovery notification messages to the DH; and
receiving a RF discovery selection command from the DH selecting one remote NFC endpoint of the two or more remote NFC endpoints with which to communication.

9. A computer program product, comprising:
a computer-readable medium comprising code for:
receiving a core initialization command, from a device host (DH), as part of an initialization and activation procedure for a near field communications (NFC) controller (NFCC);
transmitting a core initialization response to the DH without information associated with a static radio frequency (RF) connection;
detecting one or more remote NFC endpoints;
determining a maximum payload size and an initial number of credits for the static RF connection based, at least in part, on at least one of a RF interface or a RF protocol used by a remote NFC endpoint chosen for communications; and
transmitting the determined maximum payload size and the initial number of credits to the DH to establish a logical connection.

10. The computer program product of claim 9, wherein the computer-readable medium further comprises code for:
assigning a connection identifier to the logical connection.

11. The computer program product of claim 10, wherein the connection identifier is assigned a number from 0 to 15.

12. The computer program product of claim 9, wherein the logical connection comprises a static RF connection.

13. The computer program product of claim 9, wherein the logical connection comprises a dynamic logical connection.

14. The computer program product of claim 9, wherein the one or more remote NFCC endpoints comprises:
a remote NFC tag, a reader/writer device, a remote peer initiator device, or a remote peer target device.

15. The computer program product of claim 14, wherein the remote NFC tag comprises a tag type in a range of 1 to 4.

16. The computer program product of claim 9, wherein the code for detecting further comprises code for:
detecting two or more remote NFC endpoints;
communicating detection of each of the two or more NFC endpoints using RF discovery notification messages to the DH; and
receiving a RF discovery selection command from the DH selecting one remote NFC endpoint of the two or more remote NFC endpoints with which to communication.

17. An apparatus for communication, comprising:
means for receiving a core initialization command, from a device host (DH), as part of an initialization and activation procedure for a near field communications (NFC) controller (NFCC);
means for transmitting a core initialization response to the DH without information associated with a static radio frequency (RF) connection;
means for detecting one or more remote NFC endpoints;
means for determining a maximum payload size and an initial number of credits for the static RF connection based, at least in part, on at least one of a RF interface or a RF protocol used by a remote NFC endpoint chosen for communications; and
means for transmitting the determined maximum payload size and the initial number of credits to the DH to establish a logical connection.

18. The apparatus of claim 17, wherein the means for determining further comprising:
means for assigning a connection identifier to the logical connection.

19. The apparatus of claim 18, wherein the connection identifier is assigned a number from 0 to 15.

20. The apparatus of claim 17, wherein the logical connection comprises a static RF connection.

21. The apparatus of claim 17, wherein the logical connection comprises a dynamic logical connection.

22. The apparatus of claim 17, wherein the one or more remote NFCC endpoints comprises:
a remote NFC tag, a reader/writer device, a remote peer initiator device, or a remote peer target device.

23. The apparatus of claim 22, wherein the remote NFC tag comprises a tag type in a range of 1 to 4.

24. The apparatus of claim 17, wherein the means for detecting further comprises:
means for detecting two or more remote NFC endpoints;
means for communicating detection of each of the two or more NFC endpoints using RF discovery notification messages to the DH; and
means for receiving a RF discovery selection command from the DH selecting one remote NFC endpoint of the two or more remote NFC endpoints with which to communication.

25. An apparatus for communication, comprising:
a device host (DH);
a near field communication (NFC) controller (NFCC), in communication with the DH, and configured to:
receive a core initialization command, from the DH, as part of an initialization and activation procedure;
transmit a core initialization response to the DH without information associated with a static radio frequency (RF) connection;
detect one or more remote NFC endpoints;
determine a maximum payload size and an initial number of credits for the static RF connection based, at least in part, on at least one of a RF interface or a RF protocol used by a remote NFC endpoint chosen for communications; and
transmit the determined maximum payload size and the initial number of credits to the DH to establish a logical connection.

26. The apparatus of claim 25, wherein the NFCC is further configured to:
assign a connection identifier to the logical connection.

27. The apparatus of claim 26, wherein the connection identifier is assigned a number from 0 to 15.

28. The apparatus of claim 25, wherein the logical connection comprises a static RF connection.

29. The apparatus of claim 25, wherein the logical connection comprises a dynamic logical connection.

30. The apparatus of claim 25, wherein the one or more remote NFCC endpoints comprises:
a remote NFC tag, a reader/writer device, a remote peer initiator device, or a remote peer target device.

31. The apparatus of claim 30, wherein the remote NFC tag comprises a tag type in a range of 1 to 4.

32. The apparatus of claim 25, wherein the NFCC is further configured to:
- detect two or more remote NFC endpoints;
- communicate detection of each of the two or more NFC endpoints using RF discovery notification messages to the DH; and
- receive a RF discovery selection command from the DH selecting one remote NFC endpoint of the two or more remote NFC endpoints with which to communication.

* * * * *